(12) United States Patent
Watanabe et al.

(10) Patent No.: US 6,756,770 B2
(45) Date of Patent: Jun. 29, 2004

(54) AC GENERATOR CONTROL SYSTEM FOR VEHICLE

(75) Inventors: Yasuyuki Watanabe, Kariya (JP); Toshiya Konishi, Kariya (JP); Toshiyo Ogino, Kariya (JP)

(73) Assignee: Denso Corporation, Kariya (JP)

( * ) Notice: Subject to any disclaimer, the term of this patent is extended or adjusted under 35 U.S.C. 154(b) by 88 days.

(21) Appl. No.: 10/251,995

(22) Filed: Sep. 23, 2002

(65) Prior Publication Data

US 2003/0062877 A1 Apr. 3, 2003

(30) Foreign Application Priority Data

Sep. 28, 2001 (JP) ........................................ 2001-302104

(51) Int. Cl.[7] .............................................. H02P 9/04
(52) U.S. Cl. .......................................... 322/28; 322/25
(58) Field of Search ............................. 322/28, 25, 22, 322/59

(56) References Cited

U.S. PATENT DOCUMENTS

| | | | |
|---|---|---|---|
| 5,099,189 A | | 3/1992 | Iwaki et al. .................. 322/25 |
| 5,731,690 A | * | 3/1998 | Taniguchi et al. ............ 322/28 |
| 5,754,030 A | * | 5/1998 | Maehara et al. .............. 322/19 |
| 5,966,001 A | * | 10/1999 | Maehara et al. .............. 322/28 |
| 6,043,632 A | * | 3/2000 | Maehara et al. .............. 322/28 |
| 6,313,613 B1 | * | 11/2001 | Iwatani et al. ................ 322/12 |
| 6,462,517 B2 | * | 10/2002 | Asada .......................... 322/28 |
| 6,664,767 B2 | * | 12/2003 | Takahashi et al. ............ 322/28 |

FOREIGN PATENT DOCUMENTS

JP         A 6-311800        11/1994

* cited by examiner

Primary Examiner—Nicholas Ponomarenko
(74) Attorney, Agent, or Firm—Oliff & Berridge, PLC

(57) ABSTRACT

A generator control system for a vehicle includes an AC generator, a switch connected in series with a field coil, a voltage regulator unit, a field-current restricting unit for controlling the switch to turn on or off, a forbidding unit having a command signal input terminal for forbidding operation of the field-current restricting unit when a voltage higher than a predetermined regulation voltage is applied to the command signal input terminal.

8 Claims, 8 Drawing Sheets

AC GENERATOR CONTROL SYSTEM FOR VEHICLE

CROSS REFERENCE TO RELATED APPLICATION

The present application is based on and claims priority from Japanese Patent Application 2001-302104, filed Sep. 28, 2001, the contents of which are incorporated herein by reference.

BACKGROUND OF THE INVENTION

1. Field of the Invention

The present invention relates to an AC generator control system for a vehicle, such as a passenger car or a truck.

2. Description of the Related Art

There is an AC generator control system for a vehicle that is provided with a function for controlling the output power of the AC generator to stabilize the idling speed of an engine. On the other hand, it is necessary to measure the output power of such an AC generator accurately as possible in a short time for a delivery inspection. For this purpose, such an output control function has to be invalidated.

JP-A-6-311800 discloses an AC generator control system that has a field-current restricting circuit. When voltage of an L-terminal to which a charge lamp is connected becomes lower than a predetermined voltage, the field-current restricting circuit is disabled.

It is desirable to employ a MOSFET as a switching element of the field-current restricting circuit in view of minimizing electric power loss.

However, such a MOSFET may fail to restrict the field current if the L-terminal voltage is excessively lower than a predetermined voltage. When an electric load is connected and the charge lamp is turned on, the input torque of the AC generator may abruptly increase. As a result, vibration of the engine may increase so much that vehicle speed may decrease.

In addition, a so called IG-terminal with which whether the key switch is turned on or off is detected and a so called L-line connected to the L-terminal are integrated to simplify assembling works. The integration of the IG-terminal and the L-terminal may make the delivery inspection more difficult because the output power control can not be maintained if the L-terminal voltage is lower than a predetermined voltage.

SUMMARY OF THE INVENTION

Therefore, the present invention has been made in view of the above problems.

It is a main object of the invention to provide a generator control system for a vehicle that can maintain the output power even when the field-current restricting function is disabled during the delivery inspection.

According to a feature of the invention, a generator control system for a vehicle includes an AC generator having a field coil, a rectifying unit, a switch connected in series with the field coil, a voltage regulator unit, a field-current restricting unit for controlling the switch, a forbidding unit having a command signal input terminal for disabling operation of the field-current restricting unit when a voltage higher than a predetermined regulation voltage is applied to the command signal input terminal. Therefore, whenever a voltage higher than a predetermined reference voltage is applied to the forbidding unit from outside, the field-current restricting unit can be disabled. As a result, accurate delivery inspection of the AC generator can be carried out in a short time.

The forbidding unit may disable the field-current restricting unit when the voltage applied to the command signal input terminal is higher than the predetermined regulation voltage for a period longer than a predetermined period. This prevents erroneous operation of the forbidding unit. The rectifying unit may be comprised of a plurality of zener diodes having a breakdown voltage, and the voltage applied to the command signal input terminal is higher than the breakdown voltage. Therefore, even if a high surge voltage is generated by some electric device, the rectifying unit can absorb the surge voltage, thereby preventing erroneous operation of the generator control system.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

Some preferred embodiments of the invention are described with reference to the appended drawings.

Figure 2:
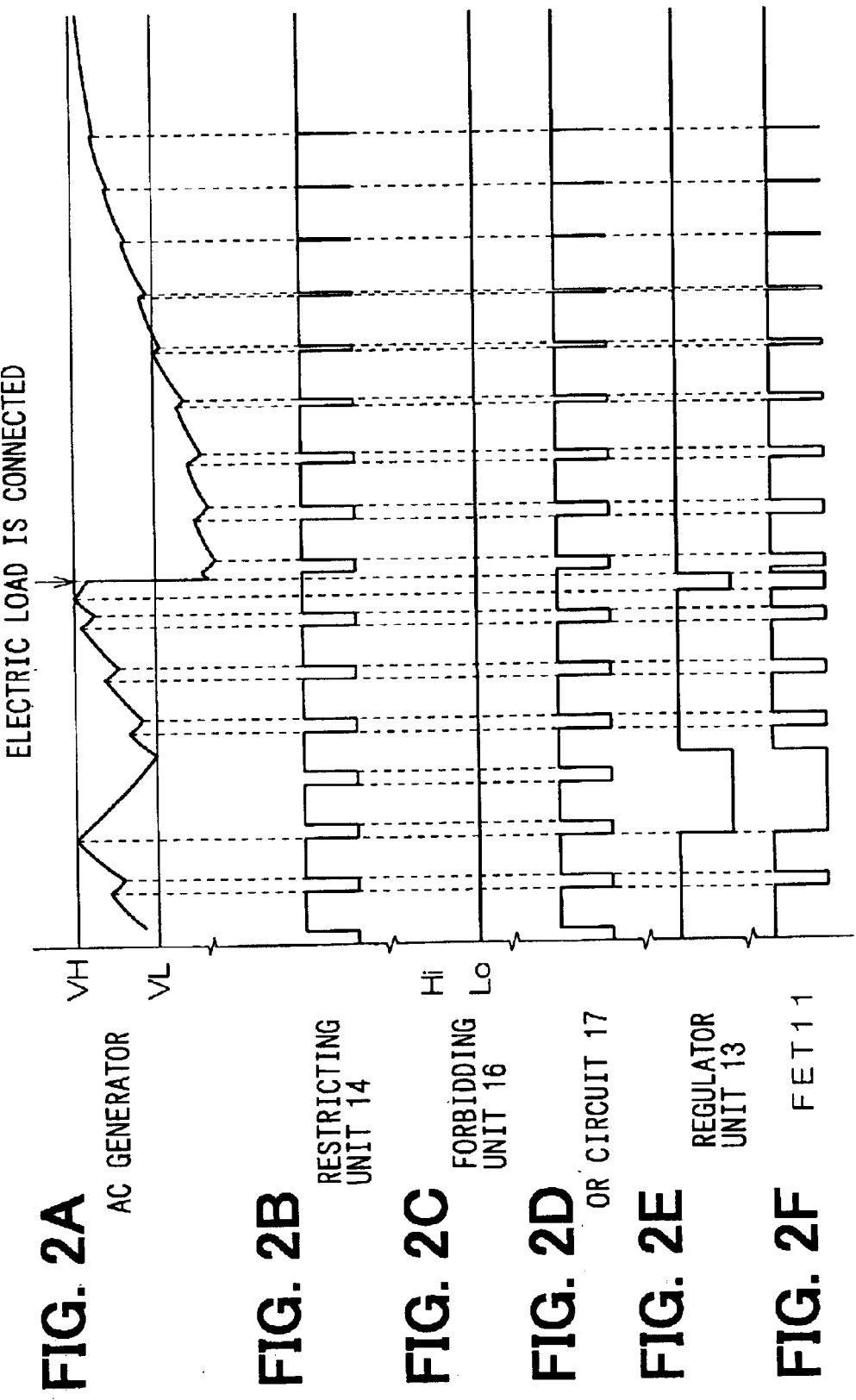
FIG. 2 is a graph showing voltage signals at various portions of the AC generator control system while a field-current restricting unit is operating.
Figure 3:
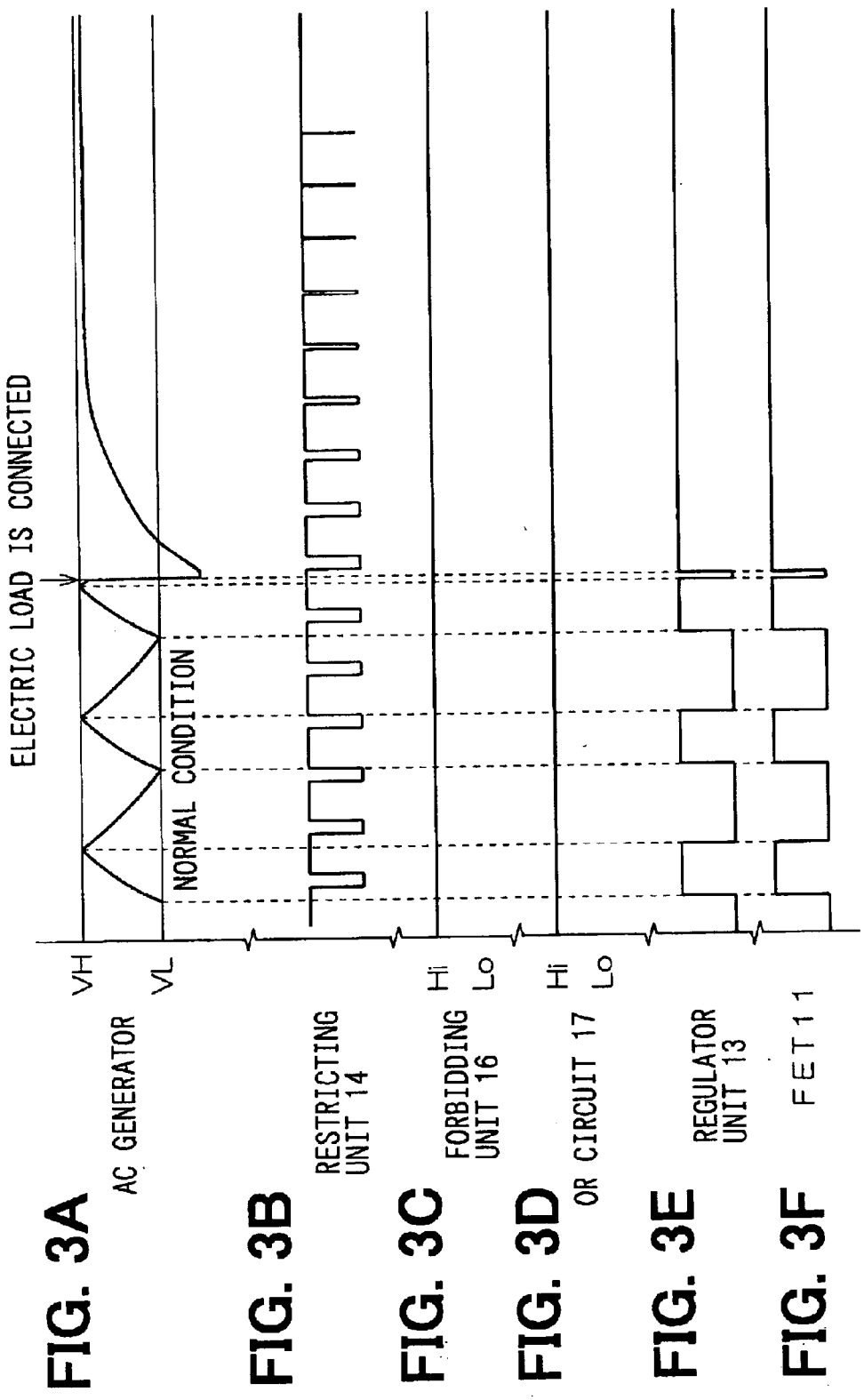
FIG. 3 is a graph showing voltage signals at various portions of the AC generator control system while field-current restricting unit is being disabled.

An AC generator control system for a vehicle according to the first embodiment of the invention is described with reference to FIGS. 1–3.

The AC generator control system 1 controls the output voltage of an AC generator 2 within a predetermined range. The AC generator 2 includes a three-phase stator winding 21, a field coil 22 that is mounted in the rotor thereof and a three-phase full-wave rectifying unit 23 for rectifying the output power of the stator winding 21. The control of the output voltage of the AC generator is carried out by controlling the field current to be supplied to the field coil 22. The output terminals (B-terminal) of the AC generator 2 is connected to a battery 3 and an electric load 4 to supply the output power of the AC generator 2 to them.

Figure 1:
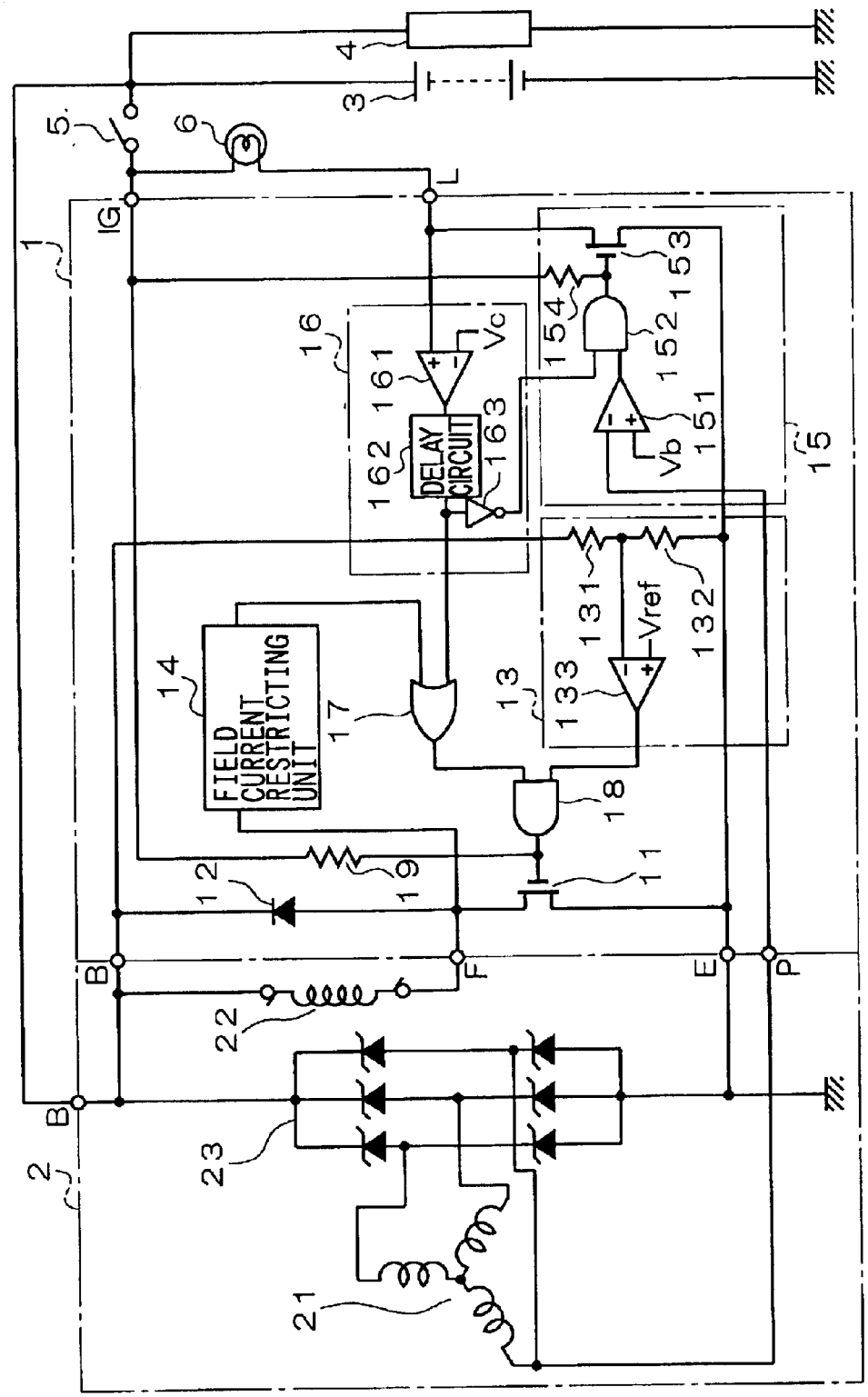
FIG. 1 is a schematic circuit diagram of a AC generator control system for a vehicle according to the first embodiment of the invention.

As shown in FIG. 1, the AC generator control system 1 includes a MOSFET 11 connected in series with the field coil 22, a flywheel diode 12 connected in parallel with the field coil 22, a voltage regulator unit 13, a field-current restricting unit 14, a charge-lamp driving unit 15, forbidding unit 16, an OR circuit 17 and an AND circuit 18.

The MOSFET 11 switches on or off the field current. The flywheel diode 12 allows the field current flowing through it when the FET 11 turns off. The voltage regulator unit 13 controls the switching operation of the FET 11. The forbidding unit 16 forbids the field-current restricting unit 14 to restrict the field current. The OR circuit 17 provides the logical sum of the output signals of the field-current restricting unit 14 and the forbidding unit 16. The AND circuit 18 provides the logical product of the output signals of the voltage control unit 13 and the OR circuit 17. The voltage regulator unit 13 is comprised of resistors 131, 132 and a voltage comparator 133. The resistors 131, 132 forms a voltage dividing circuit for dividing the voltage of the B-terminal of the AC generator 2. The divided voltage is applied to the negative terminal of the voltage comparator 133, which compares the divided voltage and reference voltage Vref that is applied to the positive terminal of the comparator 133. The comparator 133 provides a high level signal when the voltage of the B-terminal becomes so low that the divided voltage becomes lower than the reference voltage Vref. On the other hand, the comparator 133 provides a low level signal when the voltage of the B-terminal becomes so high that the divided voltage becomes higher than the reference voltage Vref.

The charge-lamp driving unit 15 is comprised of a voltage comparator 151, an AND circuit 152, a MOSFET 153 and a resistor 154. The comparator 151 has a negative terminal to which phase-voltage of a P-terminal of the stator winding 21 is applied. The comparator 151 provides a high level output signal when the phase-voltage becomes lower than a reference voltage Vb that is applied to the positive terminal of the comparator 151. The output terminal of the comparator 151 is connected to a gate of the FET 153 via the AND circuit 152. When the comparator 151 provides the high level output signal, the FET 153 is turned on to, thereby, turn on the charge lamp 6 that is connected between the L-terminal and the IG-terminal. On the other hand, when the phase voltage becomes higher than the reference voltage Vb, the comparator 151 provides the low level output signal to turn off the charge lamp 6. The resistor 154 supplies driving voltage to the FET 153.

The forbidding unit 16 is comprised of a voltage comparator 161, a delay circuit 162 and an inverter 163. The comparator 161 has a positive terminal to which the voltage of the L-terminal is applied. When the voltage of the L-terminal is higher than a reference voltage Vc that is applied to the negative terminal of the comparator 161, the comparator 161 provides a high level output signal. On the other hand, when the voltage of the L-terminal is lower than the reference voltage Vc, the comparator 161 provides a low level output signal. The delay circuit 162 is connected to the output terminal of the voltage comparator 161 to delay the output signal of the same for a fixed time. The inverter 163 inverts the logical output of the delay circuit 161 and supplies the inverted signal to the AND circuit 152 of the charge-lamp driving unit 15.

When the voltage of the L-terminal is higher than the reference voltage Vc, the output signal of the voltage comparator 161 becomes high. This high level output signal is supplied to one of the input terminals of the OR circuit 17 via the delay circuit 162 to disable the current restricting function of the field-current restricting unit 14. At the same time, the output signal of the delay circuit 162 is inverted by the inverter 163 and supplied to one of the input terminals of the AND circuit 152 of the charge-lamp driving unit 15. Accordingly, the output signal of the AND circuit 152 is fixed to be low. Thus, the FET 153 is not operated as long as the field-current restricting function is disabled, so that the FET 153 can be prevented from being damaged even if an excessively high voltage is applied to the L-terminal.

The reference voltage Vc to be applied to the negative terminal of the voltage comparator 161 of the forbidding unit 16 is higher than the output regulation voltage of the AC generator 2 (e.g. 20 V). If the AC generator operate normally, no voltage that is higher than the breakdown voltage is generated. Therefore, the reference voltage Vc is set higher than the breakdown voltage of the diodes of the rectifying unit 23 so that the reference voltage Vc can ensure the operation of the forbidding unit 16.

Just when the engine key switch of a vehicle is turned on, the AC generator 2 generates no voltage. At that time, the voltage comparator 151 of the charge-lamp driving unit 15 provides a high level output signal. Since the voltage of the L-terminal is lower than the reference voltage Vc, the forbidding unit 16 is disabled, and the inverter 163 provides a high level output signal. Accordingly, the signals to be applied to both input terminals of the AND circuit 152 become high, so that the FET 153 is turned on to turn on the charge lamp 6 that is connected between the L-terminal and the IG-terminal.

When the engine starts and the AC generator 2 starts generation, the phase voltage Vp of the stator winding 21 becomes higher than the reference voltage Vb. Accordingly, the voltage comparator 151 of the charge-lamp driving unit provides a low level output signal, and the AND circuit 152 also provides a low level output signal. As a result, the FET 153 is turned off, thereby turning off the charge lamp 6. The output voltage of the AC generator 2 is regulated to be a suitable regulation voltage by intermittently controlling the field current flowing through the field coil 22.

Operation of the field-current restricting unit 14 while the AC generator control system 1 is operating in a normal condition is described below with reference to FIGS. 2A–2F and 3A–3F.

While the AC generator 2 is generating power under the normal voltage regulating condition at an average conduction rate of the F-terminal being about 60%, the field-current restricting unit 14 provides its output signal having 70% duty-ratio, as shown in FIG. 2B. When an electric load is connected to the AC generator 2, the output voltage of the AC generator 2 instantly decreases to a level lower than a level VL, as shown in FIG. 2A. The voltage regulator unit 13 maintains a high level output signal thereafter, as shown in FIG. 2E. Since the field-current restricting unit 14 provides the output signal having 70% duty-ratio and the forbidding unit 16 provides a low level output signal, the OR circuit 17 provides the same output signal as the field current restricting unit 14. Accordingly, the AND circuit 18 provides the same output signal as the OR circuit 17, thereby to control the FET 11 at 70% duty ratio. Thereafter, the field-current restricting unit 14 gradually increases the duty ratio from 70%. The voltage of the L-terminal is lower than the reference voltage Vc, and the output signal of the forbidding unit 16 is low, as shown in FIG. 2C.

Therefore, the conduction rate of the FET 11 gradually increases, so that the field current flowing into the field coil 22 gradually increases to increase the output power of the AC generator 2. When the electric load is connected to the AC generator 2, the average conduction rate of the FET 11 gradually increases. As a result, the input torque of the AC generator 2 does not abruptly increase, and this does not cause vibration or rotation speed down of the engine.

Since the voltage of the L-terminal does not become higher than the reference voltage during normal operation of the AC generator 2, the forbidding unit 16 does not function, thereby fixing the output signal thereof to be low. Therefore, the field current restriction of the field-current restricting unit 14 is maintained. On the other hand, the output signal level of the forbidding unit 16 is made high, as shown in FIG. 3C, by making the voltage of the L-terminal higher than the reference voltage Vc. Consequently, the output signal level of the OR circuit 17 always becomes high, as shown in FIG. 3D, to interrupt the signal of the field-current restricting unit 14. Since the output signal of the inverter 163 of the forbidding unit 16 becomes low, the output signal of the AND circuit 152 of the charge-lamp driving unit 15 is fixed to the low level to maintain the FET 153 to be off. Therefore, the charge lamp 6 does not turn on.

Since whenever a voltage higher than the reference voltage Vc is applied to the L-terminal to, thereby, cause the forbidding unit 16 to disable the field-current restricting unit 14, the output characteristics of the AC generator 2 can be accurately tested in a short time. In particular, since the reference voltage Vc is higher than the output regulation voltage of the AC generator 2, the forbidding unit 16 can be prevented from erroneously operating.

Since the forbidding unit 16 is provided with the delay circuit 162, the field-current restricting circuit 14 is disabled only if the voltage of the L-terminal is maintained to be higher than the reference voltage Vc for a predetermined period. Therefore, the forbidding unit 16 is prevented from erroneously operating due to noises caused by such as key-switch operation.

Figure 4:
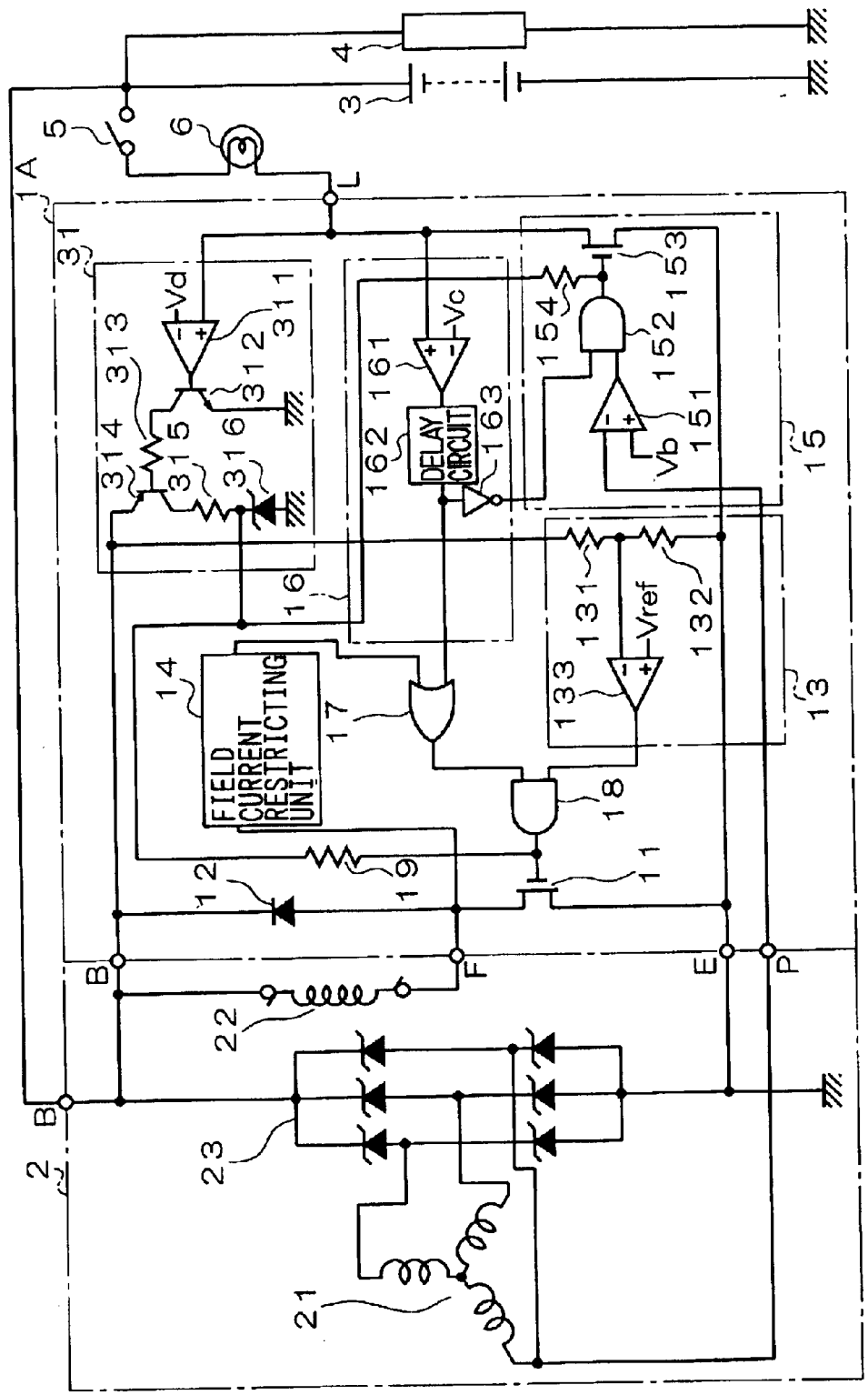
FIG. 4 is a schematic circuit diagram of a AC generator control system for a vehicle according to the second embodiment of the invention.

A generator control system 1A according to the second embodiment of the invention is described with reference to FIG. 4.

The generator control system 1A according to the second embodiment includes a power source driving unit 31 instead of the IG-terminal of the generator control system 1 according to the first embodiment.

The power source driving unit 31 includes a voltage comparator 311, transistors 312, 314, resistors 313, 315 and a zener. The voltage comparator 311 has a positive input terminal connected to the L-terminal. The output terminal of the voltage comparator 311 is connected to the base of the transistor 312. When the voltage of the L-terminal is higher than a predetermined reference voltage Vd, the voltage comparator 311 provides a high level output signal to turn on the transistor 312. Consequently, the transistor 314 is turned on, so that current flows through a series circuit of the resistor 315 and the zener diode 316. Thereafter, the voltage applied across the zener diode 316 is applied to respective gates of the FET 11 and FET 153, thereby enabling the on-off control of the same. Other operation of the generator control system 1A is substantially the same as the generator control system 1. Thus, it is possible to disable the field-current restricting unit without IG-terminal whenever a delivery inspection is carried out.

Figure 5:
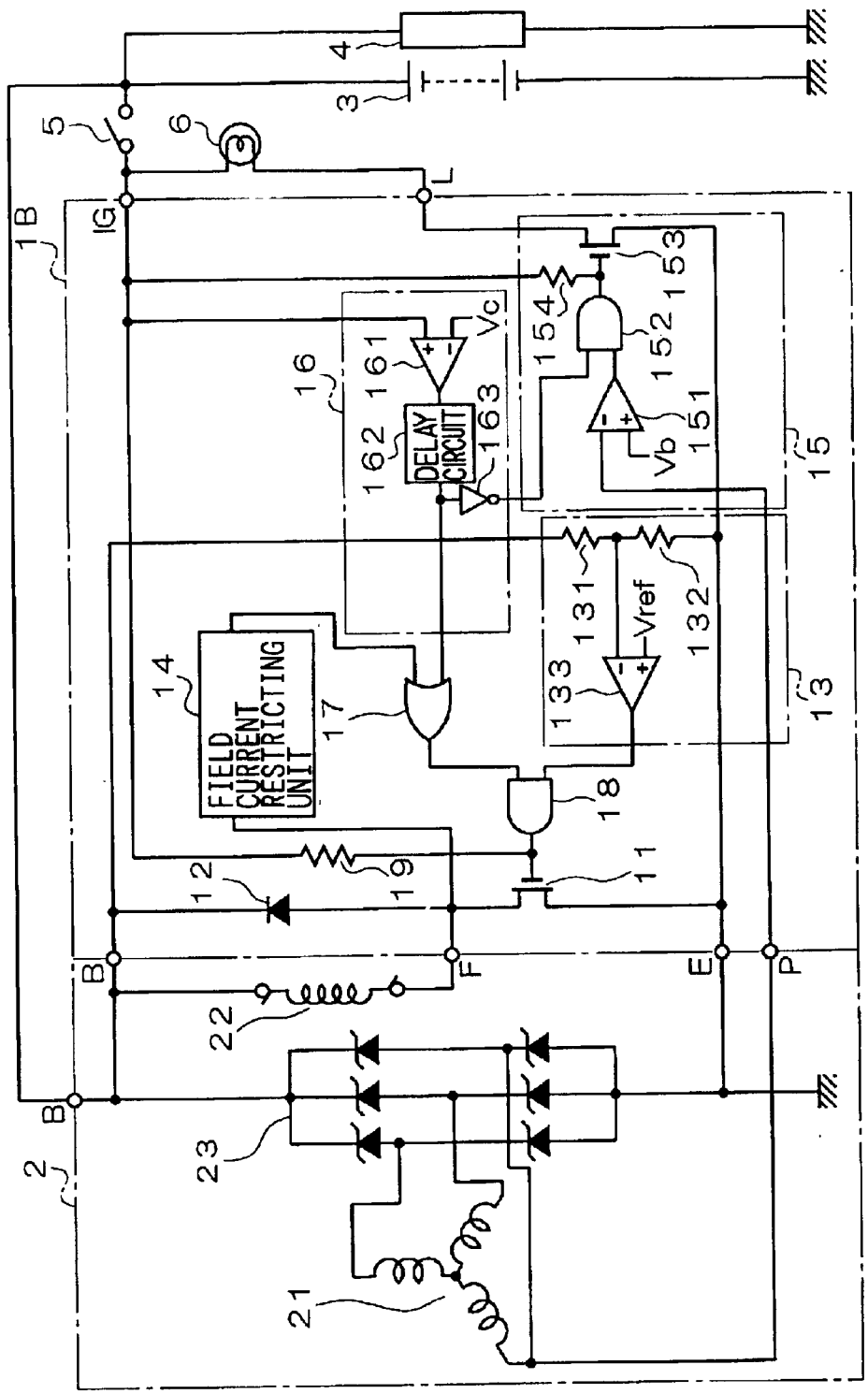
FIG. 5 is a schematic circuit diagram of a AC generator control system for a vehicle according to the third embodiment of the invention.

A generator control system 1B according to the third embodiment of the invention is described with reference to FIG. 5.

The generator control system 1B according to the third embodiment includes the same components as the generator control system 1 according to the first embodiment. However, the positive terminal of the forbidding unit 16 is directly connected to the IG-terminal instead of the charge lamp 6. Therefore, the delivery inspection can be carried out by setting the voltage of the IG-terminal higher than the reference voltage Vc to disable the field-current restricting unit.

Figure 6:
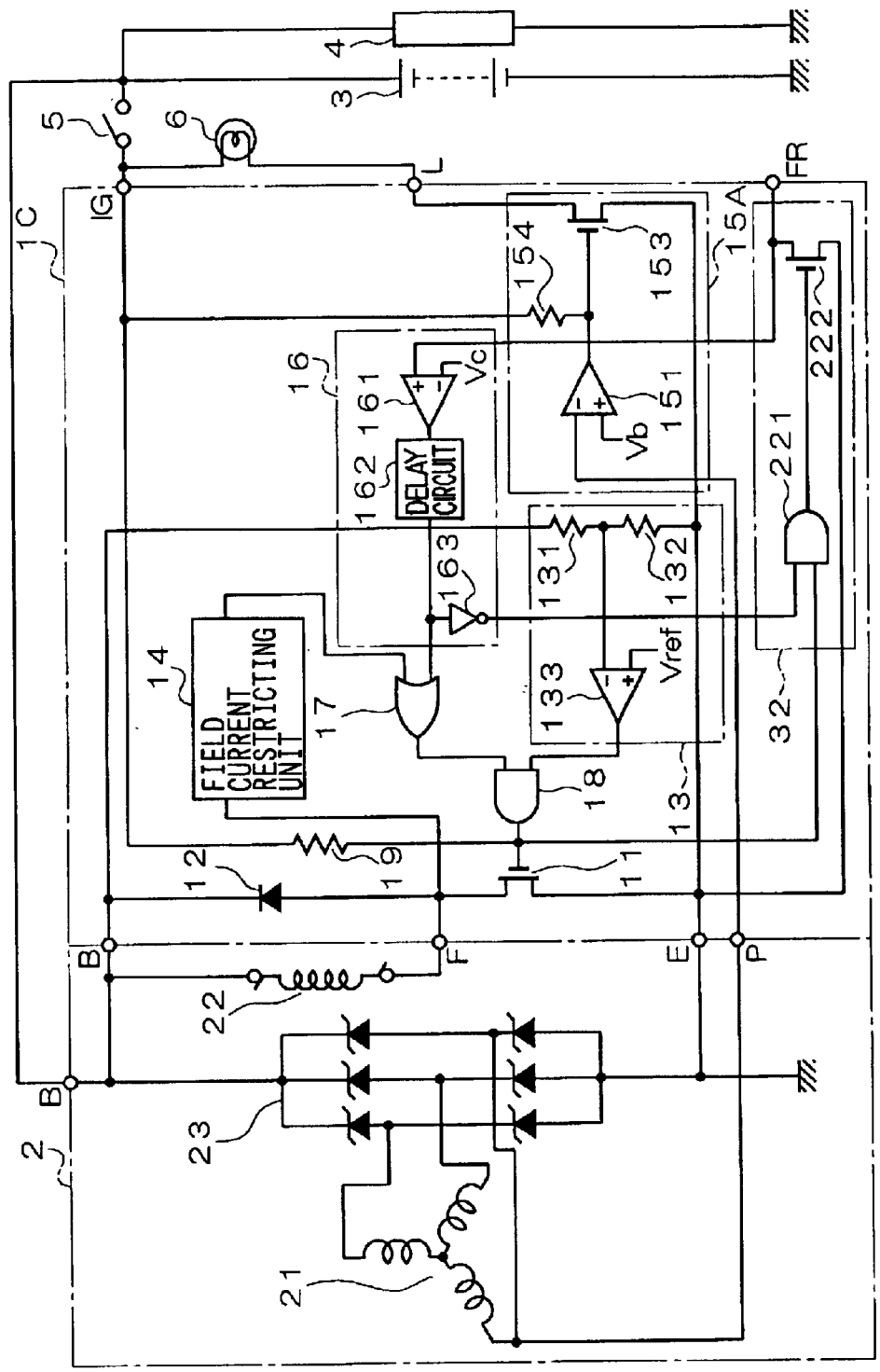
FIG. 6 is a schematic circuit diagram of a AC generator control system for a vehicle according to the fourth embodiment of the invention.

A generator control system 1C according to the fourth embodiment of the invention is described with reference to FIG. 6.

The generator control system 1C according to the fourth embodiment includes a generation-state detecting unit 32 in addition to the components of the generator control system 1 according to the first embodiment. The charge-lamp driving unit 15 of the generator control system according to the first embodiment is also replaced by a charge-lamp driving unit 15A. In addition, the positive terminal of the voltage comparator 161 of the forbidding unit 16 is connected to a FR terminal of the generator control system 1C. The AND circuit 152 of the charge-lamp driving unit 15 is omitted from the charge-lamp driving unit 15A.

The generation-state detecting unit 32 includes an AND circuit 221 and a MOSFET 222. The AND circuit 221 has one input terminal connected to the output terminal of the AND circuit 18 and the other input terminal connected to the output terminal of the inverter 163 of the forbidding unit 16. The output terminal of the AND circuit 221 is connected to the gate of the FET 222. The FET 222 operates in the same manner as the FET 11 when the output signal of the inverter 163 is high.

While the AC generator 2 is generating the output power in the normal operation, the voltage of the FR-terminal is lower than the reference voltage Vc, and the forbidding unit 16 does not act. Since the output signal of the inverter 163 of the forbidding unit 16 is fixed to the high level at that time, the FET 222 of the generation-state detecting unit 32 is controlled to turn on or off in the same manner as the FET 11. Accordingly, the FR-terminal provides a signal that indicates a generation-state of the AC generator.

During the delivery inspection, the voltage of the FR-terminal is set higher than the reference voltage Vc to disable the field-current restricting unit. Since the FET 222 of the generation-state detecting unit 32 is turned off during the delivery inspection, the FET 222 is prevented from being damaged.

Figure 7:
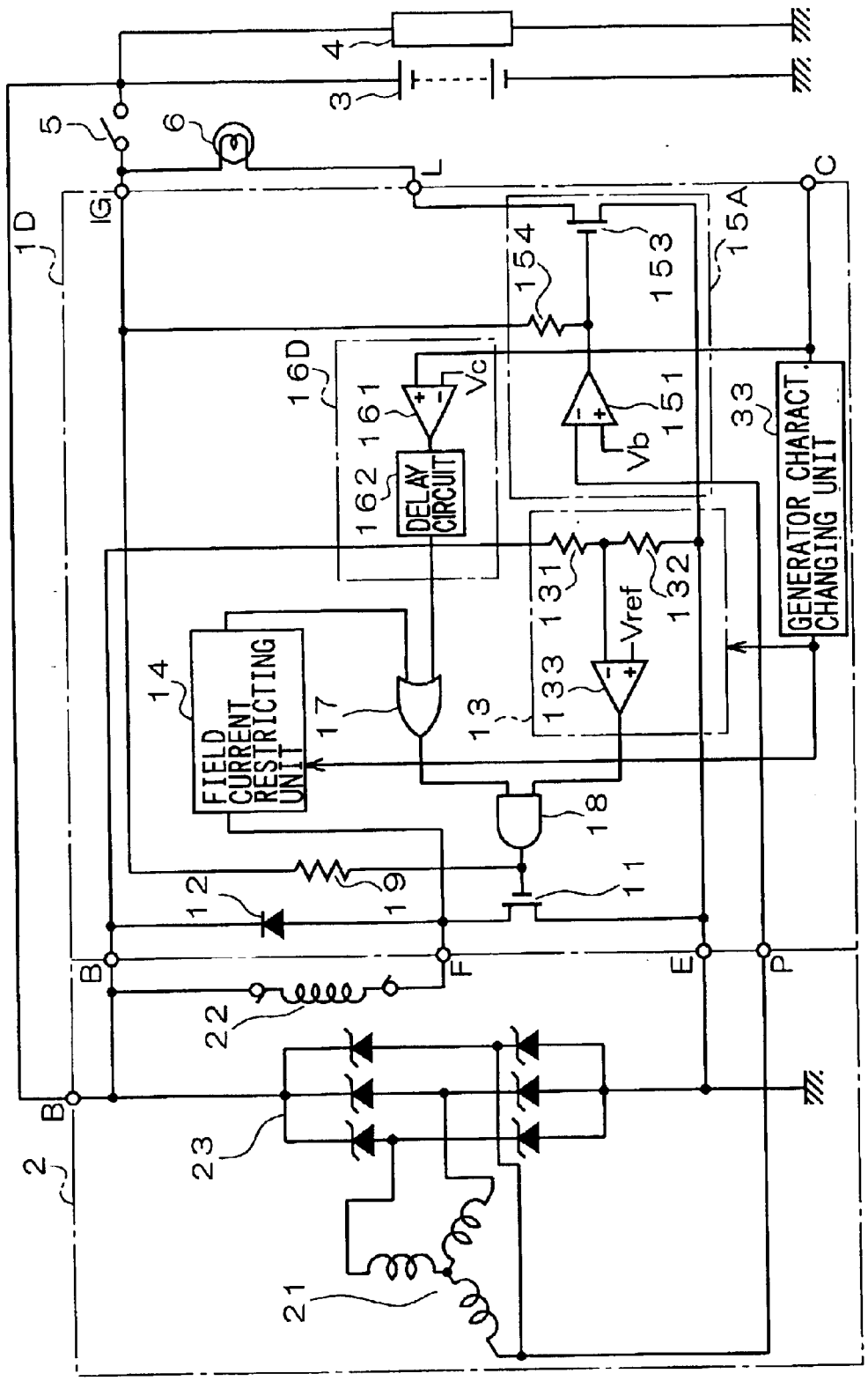
FIG. 7 is a schematic circuit diagram of a AC generator control system for a vehicle according to the fifth embodiment of the invention.

A generator control system 1D according to the fifth embodiment of the invention is described with reference to FIG. 7. The generator control system 1D according to the fifth embodiment includes a C-terminal for receiving an outside command signal and a generation-characteristic changing unit 33 for changing generation-characteristic according to the outside command signal in addition to the components of the generator control system 1 according to the first embodiment. The forbidding unit 16 is replaced by a forbidding unit 16D, and the charge-lamp driving unit 15 is also replaced by the charge-lamp driving unit 15A.

The forbidding unit 16D omits the inverter 163 of the forbidding unit 16 of the AC generator control system 1 according to the first embodiment. The positive terminal of the voltage comparator 161 of the forbidding unit 16D is connected to the C-terminal. The generation-characteristic changing unit 33 sends a generation-characteristic changing signal to the field-current restricting unit 14 when the C-terminal receives the outside command signal, so that the generation characteristic of the AC generator 2 is changed.

Normally, the generation characteristic of the AC generator 2 is changed according to the outside command signal. On the other hand, the field-current restricting unit is disabled by applying a voltage higher than the reference voltage Vc to the C-terminal when the delivery inspection is carried out.

Figure 8:
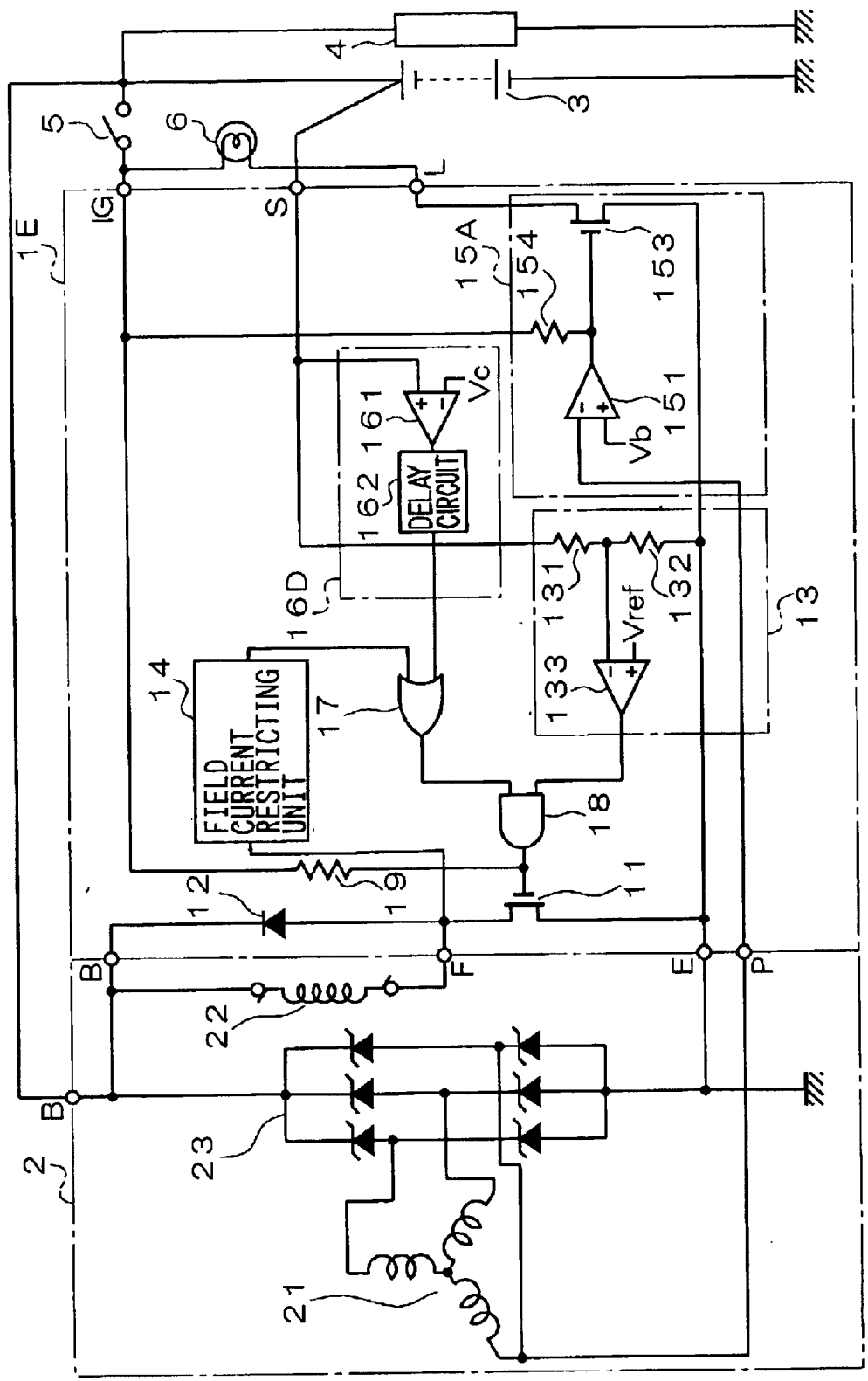
FIG. 8 is a schematic circuit diagram of a AC generator control system for a vehicle according to the sixth embodiment of the invention.

A generator control system 1E according to the sixth embodiment of the invention is described with reference to FIG. 8. The generator control system 1E according to the fifth embodiment includes an S-terminal for detecting the terminal voltage of the battery 3 in addition to the components of the generator control system 1 according to the first embodiment. The forbidding unit 16 is replaced by the forbidding unit 16D of the generator control system according to the fifth embodiment, and the charge-lamp driving unit 15 is also replaced by the charge-lamp driving unit 15A. The voltage dividing circuit of the voltage regulator unit 13, formed of resistors 131, 132, is connected to the S-terminal so that the voltage divided by the voltage dividing circuit is applied to the negative terminal of the voltage comparator 133.

In the normal operation, the voltage of the S-terminal is lower than the reference voltage Vc, and the forbidding unit 16D is not active. Therefore, the voltage regulator unit 13A controls FET 11 so that the voltage of the S-terminal is as high as a predetermined regulation voltage. In the delivery inspection, the voltage of the S-terminal is set higher than the reference voltage Vc to disable the field-current restricting unit 14.

In addition to the components described above, the AC generator control system can have a function for stopping generation to control the field current to a minimum amount for a period after an engine is started.

In the foregoing description of the present invention, the invention has been disclosed with reference to specific embodiments thereof. It will, however, be evident that various modifications and changes may be made to the specific embodiments of the present invention without departing from the scope of the invention as set forth in the appended claims. Accordingly, the description of the present invention is to be regarded in an illustrative, rather than a restrictive, sense.

What is claimed is:

1. A generator control system for a vehicle comprising:
   an AC generator having a field coil and a rectifying unit;
   a switch connected in series with said field coil;
   a voltage regulator unit for regulating output voltage of said AC generator to a predetermined regulation voltage;
   a field-current restricting unit for restricting current supplied to said field coil, said field-current restricting unit controlling said switch to turn on or off the field current; and
   a forbidding unit having a command signal input terminal for forbidding operation of said field-current restricting unit when a voltage higher than said predetermined regulation voltage is applied to said command signal input terminal.

2. The generator control system as claimed in claim 1, wherein said forbidding unit disables said field-current restricting unit when the voltage applied to said command signal input terminal is higher than the predetermined regulation voltage for a period longer than a predetermined period.

3. The generator control system as claimed in claim 1, wherein said rectifying unit comprises a plurality of zener diodes having a breakdown voltage, and the voltage applied to said command signal input terminal is higher than said breakdown voltage.

4. The generator control system as claimed in claim 1, further comprising a charge lamp,
   wherein said command signal input terminal is connected to said charge lamp.

5. The generator control system as claimed in claim 1, wherein said command signal input terminal is an IG-terminal.

6. The generator control system as claimed in claim 1, further comprising a generation-state detecting unit,
   wherein said command signal input terminal is connected to said generation-state detecting unit.

7. The generator control system as claimed in claim 1, further comprising a generation-characteristic changing unit,
   wherein said command signal input terminal is connected to said generation-characteristic changing unit.

8. The generator control system as claimed in claim 1, further comprising a battery,
   wherein said command signal input terminal is connected to said battery.

* * * * *